United States Patent [19]

Johnson

[11] 4,223,043
[45] Sep. 16, 1980

[54] DETACHABLE CELL FROZEN CONFECTION FORMING AND HOLDING APPARATUS

[76] Inventor: Oliver Johnson, 3309A Via Carrizo, Laguna Hills, Calif. 92653

[21] Appl. No.: 951,786

[22] Filed: Oct. 16, 1978

Related U.S. Application Data

[63] Continuation-in-part of Ser. No. 807,367, Jun. 17, 1977, abandoned.

[51] Int. Cl.² .................. A23G 9/00; B28B 7/06
[52] U.S. Cl. ............................ 426/122; 62/1; 62/60; 62/371; 206/602; 206/820; 229/56; 229/69; 249/127; 249/130; 249/119; 426/115; 426/119; 426/135; 426/393; 426/413; 426/414
[58] Field of Search ............... 426/108, 119, 135, 393, 426/115, 66, 112, 122, 413, 414, 515; 249/127, 129, 130, 119; 206/820, 390, 602; 62/530, 60, 457, 371, 1; 150/2.1–2.4; 229/56, 87 F, 69

[56] References Cited

U.S. PATENT DOCUMENTS

| 2,008,659 | 7/1935 | Salfisberg | 206/820 X |
|---|---|---|---|
| 2,248,963 | 7/1941 | Copeman | 426/115 |
| 2,343,064 | 2/1944 | Kjorsvik | 206/820 |
| 2,496,755 | 2/1950 | Schwartberg | 426/393 |
| 2,717,661 | 9/1955 | Mayfield | 206/820 |
| 2,896,837 | 7/1959 | Risucci | 426/119 |
| 3,095,308 | 6/1963 | Rumsey | 426/414 |
| 3,129,815 | 4/1964 | Baxter | 426/115 X |
| 3,189,227 | 6/1965 | Hobbs et al. | 206/820 X |
| 3,207,420 | 9/1965 | Kindelan | 229/56 |
| 3,388,789 | 6/1968 | Simandl et al. | 206/820 X |
| 3,456,867 | 7/1969 | Repko | 229/66 |
| 3,565,389 | 2/1971 | Price | 249/130 X |

Primary Examiner—Steven L. Weinstein
Attorney, Agent, or Firm—Knobbe, Martens, Olson, Hubbard & Bear

[57] ABSTRACT

A flexible tube container has a plurality of cells linearly disposed along the length of the tube. The cells are defined by a plurality of segmented weld lines, each segmented weld line extending the width of the tube. Each segmented weld line permits fluid communication between the various cells in the container and the formation of individual frozen confections within each of the cells upon freezing of the fluid therein. Dispensing of an individual frozen confection is easily done by bending the tube along any segmented weld line, which detaches an adjacent cell containing an individual frozen confection and immediately permits sanitary consumption of the frozen confection while it is hygienically protected within the detached cell.

6 Claims, 13 Drawing Figures

U.S. Patent Sep. 16, 1980 Sheet 1 of 2 4,223,043
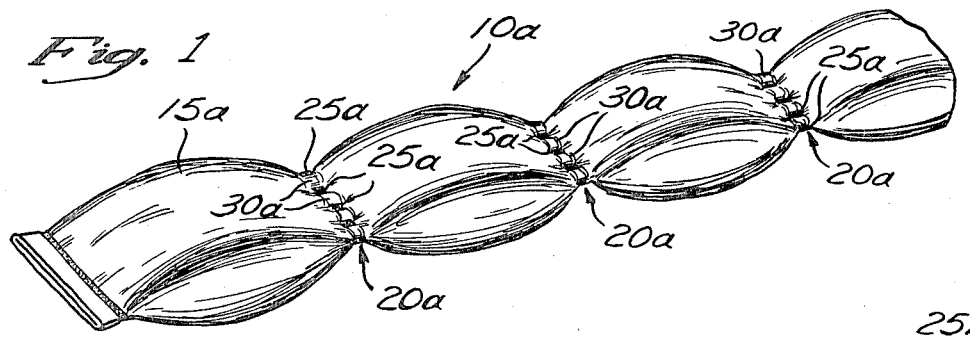
Fig. 1
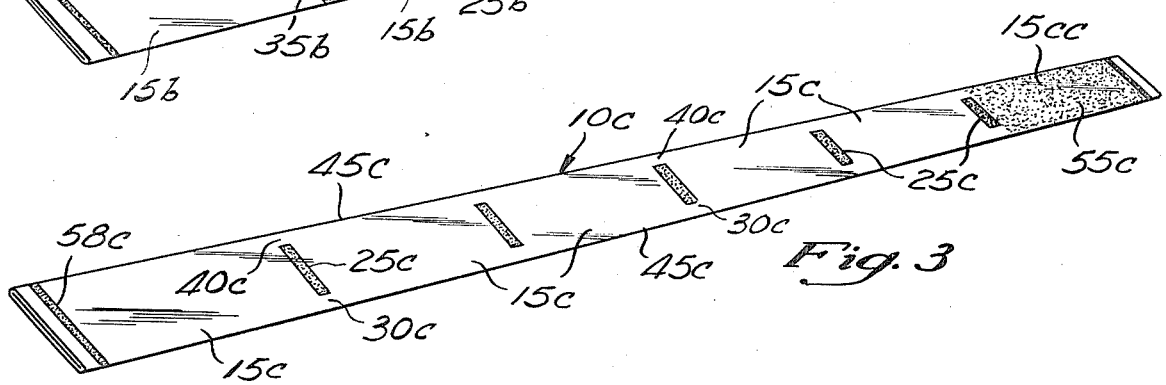
Fig. 2
Fig. 3
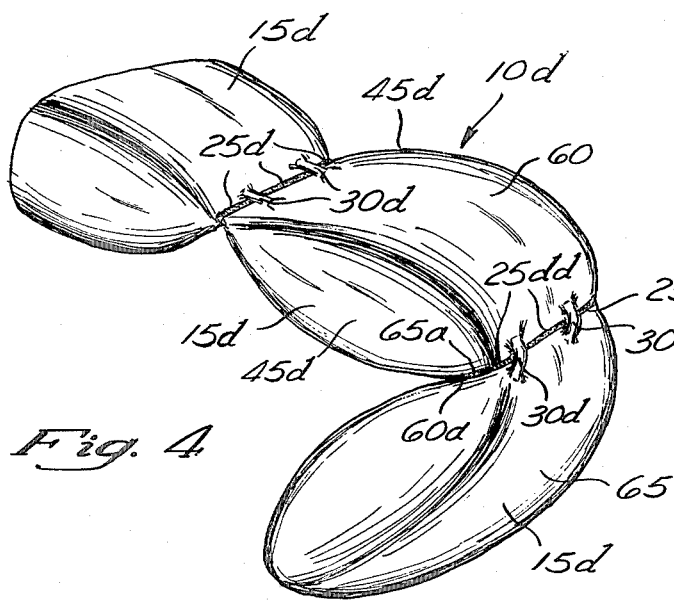
Fig. 4
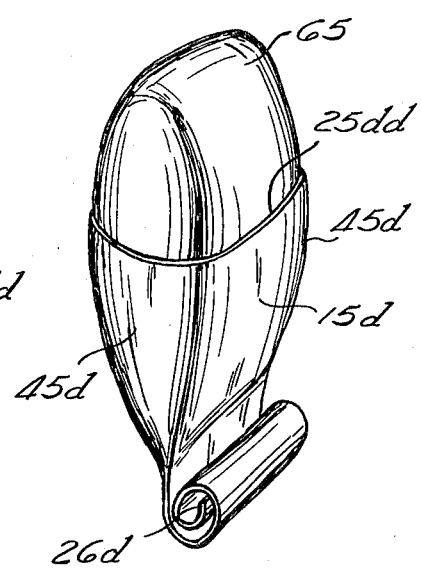
Fig. 5

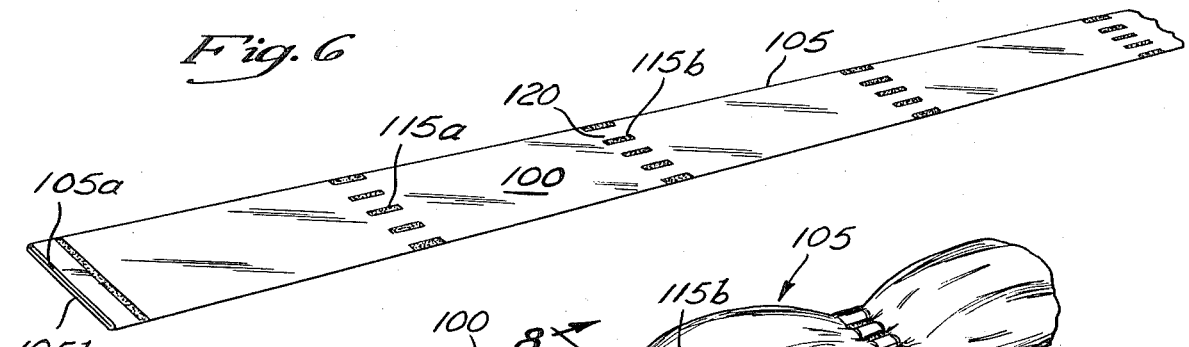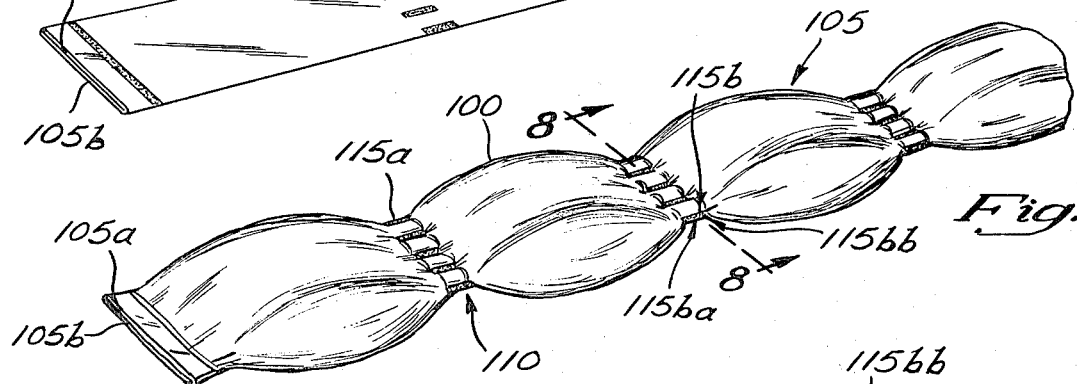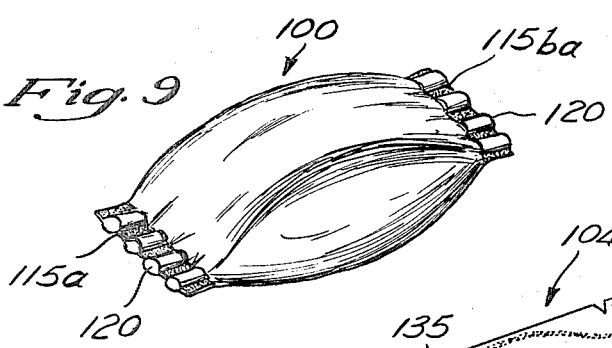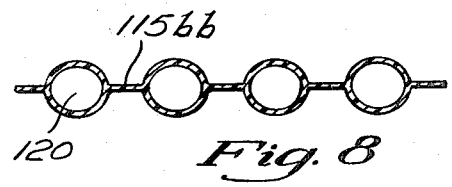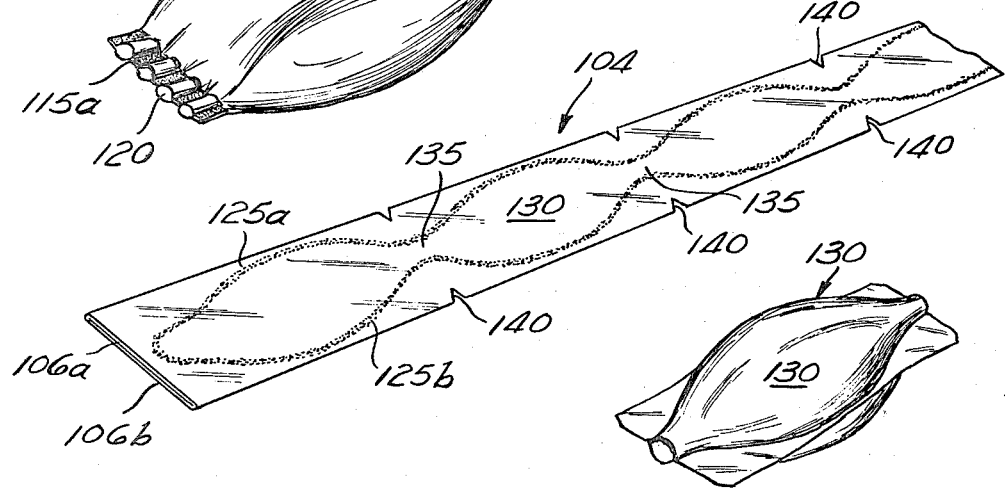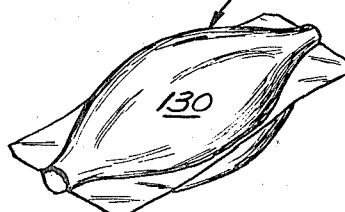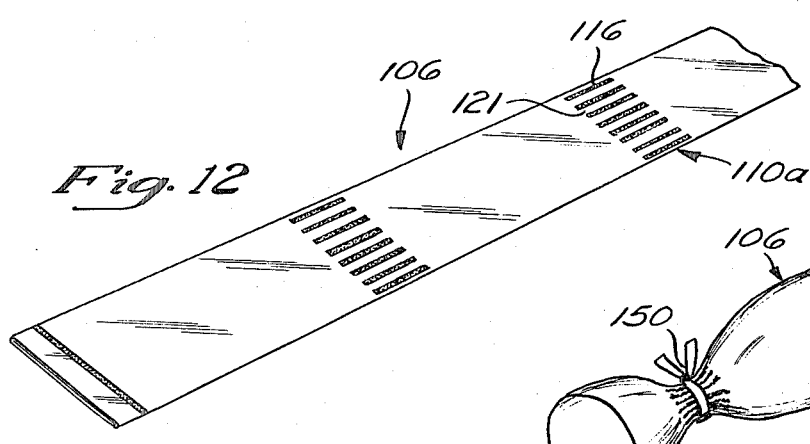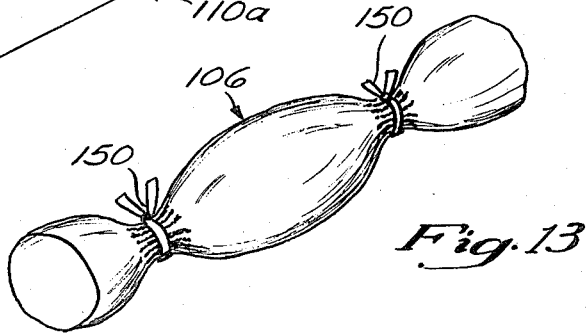

DETACHABLE CELL FROZEN CONFECTION FORMING AND HOLDING APPARATUS

RELATED APPLICATION

This application is a continuation-in-part of my prior co-pending application, Ser. No. 807,367, filed June 17, 1977, now abandoned.

BACKGROUND OF THE INVENTION

Fluid containers made from flexible plastic envelopes are well-known in the prior art, and are exemplified in the patent to Navarrete-Kindelan, U.S. Pat. No. 3,207,420. The Kindelan patent exemplifies the problems encountered in prior art fluid containers. The Kindelan '420 patent discloses a container in which individual cells communicate with other individual cells within the container on all sides of the cell. In such a container, should an individual cell be torn from the whole container, the individual cell would be breached along both its sides and its ends, due to the tearing of the cell. Such a cell would not serve to neatly contain food held within the cell, since the food would leak through the sides of the cell which was breached during the tearing and detachment of the cell. Alternatively, the Kindelan '420 patent discloses a fluid container flexible envelope in which individual cells can be torn from the container without breaching the walls of the cell. However, in this embodiment, dispensing the contents of a detached cell requires the additional step of breaching the walls of the cell after tearing the cell away from the container.

Thus, the prior art has taught that a flexible plastic container may be made to form a plurality of cells which can be individually torn away from the container. However, such containers either do not permit immediate dispensing from the cell upon detachment, or do not provide a cell which is sufficiently intact upon detachment to neatly contain food held within the cell. Furthermore, the prior art taught that if a provision is made for tearing away the individual cells of the container intact, there will be no communication between the cells in the container, nor will it be possible to dispense the contents of the cell without performing an additional step of breaching the walls of the cell.

SUMMARY OF THE INVENTION

This invention simultaneously achieves the goals of providing a container having individuals cells which communicate with one another and from which the contents may be dispensed upon detachment of an individual cell, and of providing for the detachment of individual cells which are sufficiently intact to neatly contain frozen confections within the detached cells. The invention is a flexible plastic tube container having cells which are defined by segmented weld lines bonding opposite walls of the tube to nearly close the tube. The segmented weld lines are spaced periodically along the length of the tube and extend across the width of the tube.

The tube may be filled with water or other fluid at one end of the tube and closed at the opposite end with a suitable closure such as a bread wrapper tie or plastic clip. The water will fill all of the cells in the container because each segmented weld line has a gap through which fluid may pass. This feature permits the tube of this invention to be marketed before it is filled with fluid, since the buyer may later fill the entire tube by merely introducing fluid at one end thereof. As a result, the tube need not be formed of such strength as to withstand shipment while filled with fluid, but instead may be formed of very thin plastic which may be folded into a very small package. This feature also eliminates the risk of food spoilage associated with long term storage of wet foods. A portion of the tube may be used to store a powdered confection base. Upon freezing of the water or fluid to form frozen confections, an individual frozen confection may be detached in a sanitary manner by bending the container along a segmented weld line. The bending causes two adjacent frozen confections to impinge against one another, thereby putting a large stress on the segmented weld line, which causes the tube container to tear. An individual cell may be torn away from the tube container at both of its ends using this method. The frozen confection within the cell may then be consumed by squeezing the frozen confection out of one end of the cell and rolling up the opposite end to prevent fluid melted from the frozen confection from dripping onto the user.

Because of the linear arrangement of the cells in the flexible tube container, each cell is detached only at its two ends, and therefore the side walls of the cells are not harmed or breached upon detachment of an individual cell. The detachment breaches only the adjacent segmented weld line separating adjacent cells. For this reason, the user can hold an individual frozen confection in a virtually leak-proof container while the frozen confection is consumed. The frozen confection is dispensed through one end of the detached cell, while the opposite end is rolled to prevent leakage.

The segmented weld lines restrict the expansion of the flexible plastic tube container during freezing of the fluid forming the frozen confection. Thus, the tube container forms a sausage-like configuration constricted at each line of welds after freezing of the fluid. This configuration facilitates detachment of an individual cell. Each segmented weld line adjacent an individual cell to be detached is torn when the container is bent around the segmented weld line. The sausage-like configuration of the tube ensures that each frozen confection adjacent that segmented weld line impinge one another, thereby applying stress to the weld line while affording the user a high leverage with which to apply the stress. Alternatively, the weld line provides a means facilitating easy detachment of the cell by merely tearing along the weld line.

Other embodiments of this invention are disclosed in the detailed description which follows. In all of the embodiments of this invention, the expanded flexible tube container is constricted during freezing of the fluid to form a sausage-shaped configuration, guaranteeing easy detachment of each individual cell and easy dispensing of the contents through the ends of the detached cell while preventing the breaching of the side walls of each individual cell during detachment.

In another embodiment of this invention, individual cells may be filled with fluid and sealed from one another using a plurality of clamps placed over the lines of spot welds periodically along the length of the tube, thereby permitting the dispensing of fluid in a precise, predetermined amount from an individual cell.

DESCRIPTION OF FIGURES

The invention is best understood in the following detailed description and figures, of which:

FIG. 1 is a perspective view of the preferred embodiment of this invention, filled with frozen confections;

FIG. 2 is a perspective view of a first alternative embodiment of this invention in which the container is empty;

FIG. 3 is a perspective view of a second alternative embodiment of this invention in which the container is empty;

FIG. 4 is a perspective view of a third alternative embodiment of this invention showing the process of detaching an individual cell from the container by bending the container;

FIG. 5 illustrates the dispensing of an individual frozen confection from a detached cell of this invention;

FIG. 6 is a perspective view of a fourth alternative embodiment of this invention, which is empty of fluid;

FIG. 7 is a perspective view of the tube container of FIG. 6, but filled with frozen confection;

FIG. 8 is a cross-sectional view of the tube container of FIG. 7, taken along lines 8—8 of FIG. 7;

FIG. 9 is a perspective view of an individual detached cell of the tube container of FIG. 7;

FIG. 10 is a perspective view of a fifth alternative embodiment of this invention, which is empty of fluid;

FIG. 11 is a perspective view of a detached, individual cell of the tube container of FIG. 10, and containing a frozen confection;

FIG. 12 is a perspective view of a sixth alternative embodiment of this invention, empty of fluid; and FIG. 13 is a perspective view of the tube container of FIG. 12 filled with fluid and clamped along either end of one of its cells.

DETAILED DESCRIPTION OF THE INVENTION

FIG. 1 is a perspective view of the preferred embodiment of the frozen confection forming tube of this invention which includes the feature of a plurality of spot welds in each segmented weld line. The tube 10a is preferably formed of relatively thin, clear, flexible plastic. The plastic may preferably be about one mil in thickness. The tube 10a is shown divided longitudinally into a plurality of cells 15a. Each of the cells is defined by segmented weld lines 20a, each line comprising a plurality of spot welds 25a. Each of the spot welds 25a is a small bond between facing opposing walls of the tube 10a. Each segmented weld line 20a extends the entire width of tube 10a. The welds 25a may be formed by squeezing the two facing opposing walls of the plastic tube together, and applying heat in small areas corresponding to the area of each weld.

Freezing causes the fluid contained in the tube 10a to expand, thereby expanding the tube 10a, as shown in FIG. 1. The expansion of the fluid within the tube 10a, however, is constricted at each of the segmented weld lines 20a, due to the bonding action of the individual spot welds 25a. The plurality of spot welds 25a defines a plurality of gaps 30a between the spot welds 25a. The fluid frozen within each of the gaps 30a is a relatively small amount, and therefore, expansion of the fluid within the gaps 30a is small and is restricted by the segmented weld line 20a. The gaps 30a permit fluid introduced at one end of the tube 10a to fill the entire tube by passing through the gaps 30a.

An alternative embodiment of the frozen confection forming tube of this invention using a single gap between cells is illustrated in FIG. 2, in which a tube 10b is divided into a plurality of six cells 15b by a plurality of weld lines 25b. Each weld line 25b extends the entire width of the tube 10b, and is bisected by a gap 30b. Each gap 30b permits fluid introduced at one end of the tube 10b to pass by each weld line 25b to fill the entire tube 10b. A plurality of perforations 35b may be punched through each of the weld lines 25b. The perforations 35b are preferably small in size so as not to extend beyond the region defined by the weld lines 25b to avoid puncturing a cell. The plurality of perforations 35b facilitate tearing an individual cell 15b from the remainder of the tube 10b along a weld line 25b. Each weld line 25b is preferably formed by a heat weld process which reduces the thickness of the walls of the tube 10b along the weld line, thereby further increasing the ease with which the tube 10b may torn along a weld line 25b.

FIG. 2 illustrates the shape of the flexible plastic tube 10b when the tube 10b is empty. The tube 10b is thin and flat, and because it is preferably formed of thin, light, resilient plastic, it may be easily folded and stored in a very small space.

An embodiment of the invention using two gaps and a single weld line between cells is illustrated in FIG. 3. The tube 10c of FIG. 3 is divided into a plurality of cells 15c by a plurality of weld lines 25c. The weld lines 25c extend across the width of the tube 10c. A pair of gaps 30c, 40c separate the ends of each weld line 25c from the edges 45c of the tube 10c. FIG. 3 shows the shape of the tube 10c when it is empty and contains no fluid. An end cell 15cc may be filled with a dissolvable food base 55c. The opposite end 58c of the tube 10c may then be opened and water introduced into the tube 10c. The water will fill all six cells 15c by passing through the gaps 30c, 40c and will dissolve the food base 55c, thereby distributing the powdered food substance 55c evenly throughout all six of the cells 15c.

A third alternative embodiment of the frozen confection forming tube having a plurality of linear welds instead of spot welds is shown in FIG. 4. The tube 10d in FIG. 4 is divided into a plurality of cells 15d, by a plurality of segmented weld lines 25d which extend the entire width of the tube 10d. Each weld line 25d is interrupted by a plurality of gaps 30d. Each weld line 25d serves to constrict the tube 10d, thereby forming the cells 15d. The plurality of gaps 30d in each of the weld lines 25d permits fluid to fill the entire tube 10d when the tube 10d is filled with fluid at one of its ends.

One method by which any of the frozen confection forming tubes disclosed in this specification may be broken to detach a single cell is illustrated in FIG. 4. The tube 10d is shown in FIG. 4 as being bent about the axis defined by the weld line 25dd. The two cells 15d, adjacent either side of the weld line 25dd, contain frozen confections 60 and 65. As clearly shown in FIG. 4, as the tube 10d is bent about the weld line 25dd, two opposing surfaces 60a, 65a of the frozen confections 60, 65, respectively, impinge upon one another, thereby causing a large stress across the weld line 25dd. The leverage with which this stress is applied is enhanced by the sausage shape of the tube container 10d caused by the construction of the tube container 10d at the weld lines 25dd. This stress is sufficient to sever the tube at the weld line 25dd, thereby causing the cell containing the frozen confection 65 to separate from the remainder of the tube 10d without damaging the side walls 45d.

An individual separated cell 15d is shown in FIG. 5. The frozen confection 65 may be easily held by the user and pushed up and dispensed through the broken weld 25dd. The opposite end 26d of the cell 15d may be rolled up as shown in FIG. 5 to prevent fluid melting from the frozen confection 65 from dripping onto the user and to facilitate easy dispensing of the frozen confection 65. FIG. 5 further illustrates that the plastic container defining cell 15d may be used to handle the frozen confection 65, thereby isolating the frozen confection from unsanitary handling by the user of anyone else, and guaranteeing hygienic consumption of the frozen confection 65. It is contemplated that the user of this invention will hold the frozen confection being consumed within a detached envelope during substantially the entire time that it is being consumed.

A significant feature of the invention is that the frozen confection forming tube is arranged in a plurality of cells connected end to end in linear fashion. This arrangement guarantees that detachment of an individual cell does not affect and will not rupture the sidewalls 45d of the tube 10d. This permits the user to control the dispensing of the frozen confection 65 easily by merely rolling up one end 26d of the individual cell 15d. No other precautions need be taken in order to contain the frozen confection 65 within the cell 15d.

Upon detachment of an individual cell, as shown in FIGS. 4 and 5, the remainder of the tube may be placed into freezing storage, for convenient retrieval and detachment of the next individual cell at a later time.

The tube container illustrated in FIG. 6 has a plurality of weld lines extending longitudinally of the tube. The plastic tube 105 is shown in FIG. 6 as having a flat, thin configuration because the tube 105 is empty of fluid. In this shape, the integral tube 105 appears to have two opposing walls 105a and 105b. The tube is divided longitudinally into a plurality of cells 100. The cells 100 are each defined by lines 110 of linear spot welds 115. The lines 110 of linear welds are placed periodically along the length of the tube 105 and extend across the entire width of the tube 105. The welds 115 in each line 110 are separated by gaps 120. Each of the welds 115 bonds the two opposing faces 105a, 105b of the tube 105 together. As shown in FIG. 6, the cell 100 is defined by a first plurality of linear spot welds 115a and a second plurality of linear spot welds 115b.

The expansion of the tube 105 of FIG. 6 after the tube 105 is filled with fluid and frozen is illustrated in FIG. 7. FIG. 7 also shows the constriction of the expanded tube in the vicinity of the spot welds 115a. FIG. 8 is a cross sectional view of the tube 105 of FIG. 7 taken along line 8—8 of FIG. 7. This cross-sectional view clearly shows that the expansion of the tube 105 in the vicinity of the spot welds 115b takes place only in the gaps 120. As discussed above, the sausage-like configuration of the tube facilitates easy detachment of an individual cell. An individual cell detached from the tube 105 of FIG. 7 at lines 8—8 is shown in FIG. 9. One portion 115ba of the weld 115b is shown as being torn away with the detached cell 100. FIG. 8 shows that the remaining portion, 115bb, of the weld 115b is left on the container 105.

The tube container illustrated in FIG. 10 has only two continuous weld lines. The flexible resilient plastic tube 104 of FIG. 10 has a thin, flat shape when it is empty of fluids. In this flat shape, the tube 104 appears to have two flat opposing walls, 106a, 106b. The tube 104 is divided into a plurality of cells 130 by the sausage-like shape of the continuous linear welds 125a, 125b, which extend generally along the length of the tube 104. The continuous welds 125a, 125b are spaced relatively far apart in the middle of each cell 130, but are spaced closely together at the constrictions 135 between each of the cells 130. In order to facilitate easy tearing or detachment of any of the cells 130 from the tube 104, notches 140 are provided adjacent each of the constrictions 135. Such detachment may be accomplished either by tearing at the notches 140 or by the bending method illustrated in FIG. 4. FIG. 11 illustrates an individual cell 130 containing a frozen confection in a solid sausage-like configuration, and detached from the tube 140.

The tube container illustrated in FIG. 12 is useful for dispensing liquid in predetermined amounts. The tube 106 of FIG. 12 is divided into a plurality of cells which are spaced periodically along the length of the tube 106 and extend the entire width of the tube 106. A plurality of linear welds 116 defining the cells extend longitudinally of the length of the tube. The linear welds 116 of FIG. 12 are of especially long length, and define especially long gaps 121 between adjacent welds 116. FIG. 13 illustrates that the length of the welds 116 permits clamps 150 to be easily aligned over the welds 116 to squeeze the gaps 120 closed. The embodiment illustrated in FIGS. 12 and 13 is useful for dispensing measured amounts of fluid using the tube 106 as a dispensing apparatus. In the embodiment illustrated FIGS. 12 and 13, the tube 106 may be filled with fluid, and then clamps 150 may be placed at each of the groups of spot welds 116 to close the gaps 121 and thereby provide a fluid tight seal between each of the cells of the tube 106. Dispensing of fluid from a single cell is easily accomplished by removing one of the clamps 150.

In summary, it is seen that a plastic tube may be divided into a series of cells by spot welds or linear welds, as illustrated in FIGS. 1–12. The welds cause the tube to assume a sausage-like configuration when fluid within the tube is frozen. This sausage-like configuration assures that individual cells may be detached at any of the lines of welds separating individual cells, while simultaneously breaking the welds to provide a means for easy dispensing of the contents of an individual cell immediately upon detachment. Therefore, the welds separating individual cells along the tube provide a means for easy detachment of individual cells and provide a means for easy dispensing of the contents of an individual cell immediately upon detachment of the cell. At the same time, the overall integrity of the side walls of a detached cell is maintained due to the exclusive end to end arrangement of the cells. This permits controlled and sanitary dispensing of the contents of each cell, such as a frozen confection, during the entire time that it is consumed. Thus, the linear tube, divided longitudinally into a series of cells by a plurality of linear welds, and the resulting sausage-like shape of the tube, provides not only easily detachable cells, but, unlike the prior art, also provides for fluid communication between cells, and easy dispensing of the contents of a cell immediately upon detachment, while maintaining the general integrity of the cell and its usefulness as a sanitary container.

What is claimed is:

1. A device for forming and dispensing a frozen liquid comprising:
 a tube of flexible material containing a freezable liquid having upper and lower walls, one end of said tube having entrance means for permitting the filling of said tube with liquid in an unfrozen state, the other end of said tube being sealed; and plural constriction-forming means in said tube at spaced intervals along the length thereof, for (i) dividing said tube longitudinally into a single line of a plurality of discrete cells connected exclusively in an extended arrangement, (ii) permitting the passage of unfrozen liquid into all of said cells from said entrance means, and (iii) facilitating the detachment of an individual cell from said tube when said liquid is frozen therein, while maintaining the structural integrity of the detached cell and the remaining cells in said tube, said freezable liquid being contained in said cells;

said constriction-forming means each comprising an interrupted weld line having a liquid passage gap therein and disposed laterally across said tube, said weld line constricting said tube upon the freezing expansion of liquid in each cell so that said tube is easily broken at said weld line for detachment of a first expanded cell from a second expanded cell by stress along said weld line resulting from the leverage applied by the impingement of said first and second cells against one another when said tube is bent along said weld line;

said interrupted weld line remaining intact along both said first and second cells when said first cell is detached from said second cell;

each of said detached cells providing a container for the frozen liquid contained therein, said liquid passage gap providing a weakened end for said container along the weld line at which said cell was detached, said weakened end providing a means for dispensing said frozen liquid when pressure is applied to said container; and means for closing said entrance means.

2. The device of claim 1 wherein each of said interrupted weld lines comprises a linear elongate weld joining said upper and lower walls, said elongate weld extending across a substantial portion of the width of said tube to substantially close said tube except for said liquid passage gap.

3. The device of claim 2 wherein said weld is a heat weld which reduces the thickness of said upper and lower flexible walls, so that said tube is easily torn along said weld.

4. The device of claim 2 wherein said welds are perforated so that said tube is easily torn along said weld.

5. The device of claim 1 wherein said upper and lower walls each have a thickness of less than 5 mils.

6. The device of claim 1 wherein each of said interrupted weld lines comprises a group of linear elongate welds, each of said welds extending parallel to the length of said tube for a portion of said length, said elongate welds placed side by side in said group to define a space between adjacent welds, said group of welds extending across the width of said tube.

* * * * *